A. BRADY.
Improvement in Sinks.
No. 129,091. Patented July 16, 1872.
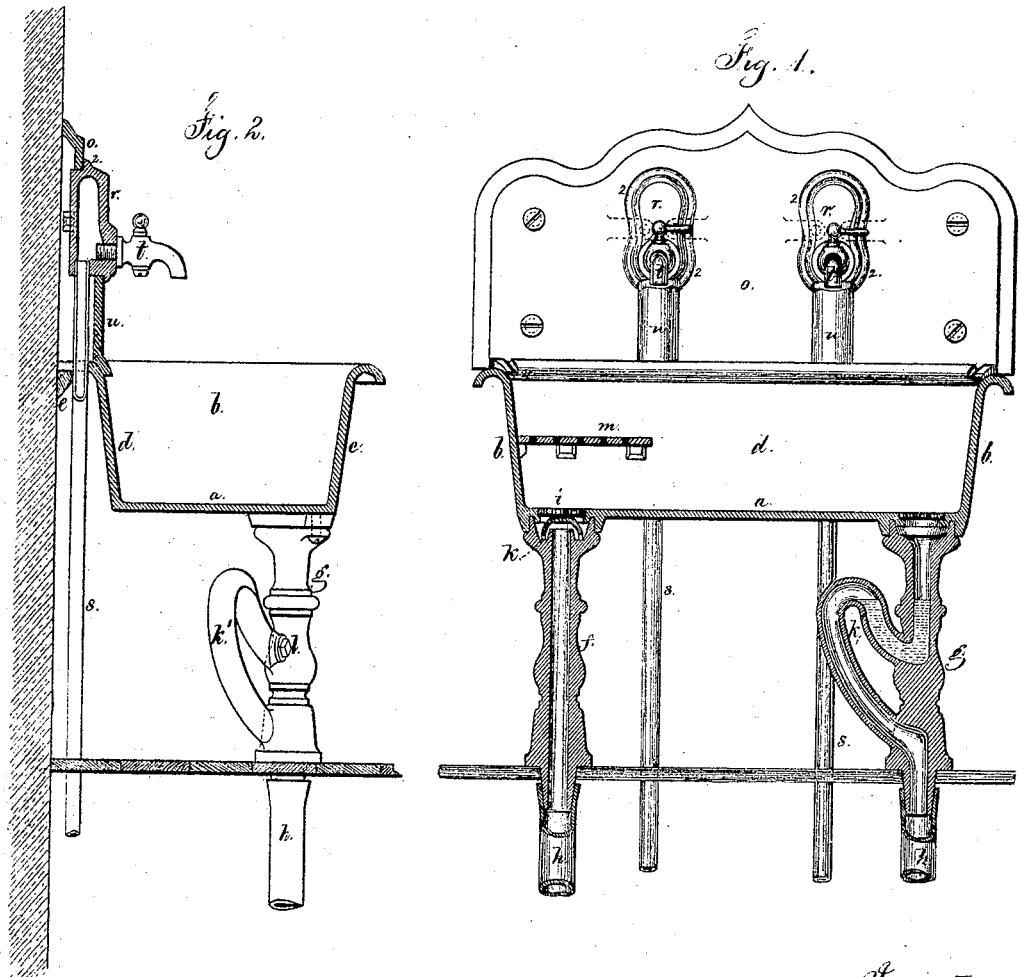

UNITED STATES PATENT OFFICE.

ALFRED BRADY, OF NEW YORK, N. Y.

IMPROVEMENT IN SINKS.

Specification forming part of Letters Patent No. 129,091, dated July 16, 1872.

*To all whom it may concern:*

Be it known that I, ALFRED BRADY, of the city and State of New York, have invented and made an Improvement in Sinks; and the following is declared to be a correct description of the same.

This invention is made for avoiding the unsightly waste or sewer pipe usually projecting through the floor and connecting with the under side of the sink where the discharge-opening is made.

My invention consists in a sink made with a hollow leg or legs, connected at the bottom with the sewer-pipe and at the top with the discharge-opening of said sink, in combination with a trap applied in such hollow leg for preventing smell passing out of the sewer-pipe. I also make use of a cast-metal back to the sink, with openings in it for receiving separate cast-metal air-chambers that are at the upper ends of the water-pipes, whereby said air-chambers can be replaced if broken, and the same back can be used with different air-chambers adapted to varying sizes of supply-pipes or delivery-faucets.

In the drawing, Figure 1 is a section of the sink and the hollow supporting-legs; and Fig. 2 is a vertical section transversely of the sink, showing the air-chamber and faucet.

The sink is made of the usual or desired size and shape, with the bottom $a$, ends $b$, front and back $c$ $d$ cast in one piece. The edge of the back $d$ is supported upon a cleat, $e$, and the front of the sink stands upon hollow legs $f$ $g$. The legs $f$ or $g$, or both, are made with tubular extensions entering the soil or waste pipe $h$, and each leg is connected at the top to the sink, and there is also a trap to close the outlet of the waste-pipe through the leg to exclude smell. The trap $k$ is shown as applied at the top of the leg $f$, in the form of a bell, with a notched edge surrounding the elevated end or rim of the waste-pipe, and below the grating $i$. The trap $k'$ to the leg $g$ is made as a bend or S, extending out from one side and rising, so as to retain sufficient water to trap the smell. In the side of this trap $k'$ is a removable screw-plug, $l$, to allow for cleaning the trap. This trap and leg should all be cast in one piece. Within the sink is a perforated shelf, $m$, supported on lugs and removable; this is very convenient for placing articles upon while water runs off them. The back plate $o$ is made to overhang the back of the sink, as usual; but, instead of having simply a hole for the water-pipe, or a cast air-chamber in it, said back plate has one or two openings in it of the required size for the air-vessel or vessels, each of which is made, as at $r$, with a flange, $q$, resting against the surface of the plate $o$, and at the bottom of the air chamber the water-pipe $s$ is screwed in. The cock or faucet $t$ is screwed into the front of the air-chamber, and the back plate $o$ of the sink is made with projecting cases $u$ to cover up the water-pipes $s$. The air-chambers may be bolted into place by screws and lugs at the rear of the back plate $o$.

I claim as my invention—

1. The hollow leg for a sink, made with a tubular projection at the lower end for the sewer-pipe and a connection at the upper end for the discharge-opening of the sink, in combination with a trap in the said hollow leg, as and for the purposes set forth.

2. A hollow leg for a sink, made with a trap upon the side thereof, and cast in one piece, as set forth.

Signed by me this 3d day of April, A. D. 1872.

ALFRED BRADY.

Witnesses:
GEO. T. PINCKNEY,
CHAS. H. SMITH.